United States Patent
Lynch et al.

(10) Patent No.: US 12,092,138 B2
(45) Date of Patent: Sep. 17, 2024

(54) COUPLING ASSEMBLIES HAVING FRANGIBLE PORTIONS

(71) Applicant: Toyota Motor Engineering & Manufacturing North America, Inc., Plano, TX (US)

(72) Inventors: Joshua S. Lynch, Temperance, MI (US); Corey J. Downing, Northville, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 249 days.

(21) Appl. No.: 17/716,569

(22) Filed: Apr. 8, 2022

(65) Prior Publication Data

US 2023/0323908 A1 Oct. 12, 2023

(51) Int. Cl.
*F16B 19/10* (2006.01)
*F16B 31/02* (2006.01)

(52) U.S. Cl.
CPC .. *F16B 19/1081* (2013.01); *F16B 2019/1018* (2013.01); *F16B 31/021* (2013.01); *F16B 2200/63* (2023.08)

(58) Field of Classification Search
CPC .......... F16B 19/1081; F16B 2019/1018; F16B 31/021; F16B 31/00; F16B 2200/63
USPC ....................... 411/2, 3, 5, 45–48
See application file for complete search history.

(56) References Cited

U.S. PATENT DOCUMENTS

| | | | |
|---|---|---|---|
| 4,832,547 A * | 5/1989 | Shiraishi | F16B 19/1081 411/39 |
| 5,378,030 A * | 1/1995 | Georgopoulos | E05B 65/0089 292/307 R |
| 6,089,805 A * | 7/2000 | Salmon | F16B 19/1081 411/57.1 |
| 6,339,970 B1 | 1/2002 | Blex | |
| 6,565,116 B1 * | 5/2003 | Tajima | F16B 21/075 24/297 |
| 6,715,746 B2 | 4/2004 | Bachmeyer et al. | |
| 8,403,356 B2 * | 3/2013 | Tago | B60R 21/026 24/297 |
| 9,103,363 B2 * | 8/2015 | Fujiwara | F16B 19/1081 |
| 10,844,893 B1 | 11/2020 | Sherman | |
| 2004/0202521 A1 * | 10/2004 | Bostik | F16B 31/021 411/2 |
| 2019/0010768 A1 | 1/2019 | Cosse | |
| 2022/0034353 A1 * | 2/2022 | Champa | B29C 70/42 |

FOREIGN PATENT DOCUMENTS

| | | |
|---|---|---|
| CN | 210057602 U | 2/2020 |
| DE | 3925670 A1 | 2/1991 |

* cited by examiner

*Primary Examiner* — Flemming Saether
(74) *Attorney, Agent, or Firm* — Dinsmore & Shohl LLP

(57) ABSTRACT

A coupling assembly for coupling a first component to a second component, the coupling assembly includes a pin and a housing. The pin includes a shaft and a pin frangible portion formed in the shaft. The housing includes a hollow body and a housing frangible portion formed in the hollow body. The housing is configured to receive the pin such that the shaft of the pin is received within the hollow body. When the pin is received in the hollow body the pin frangible portion aligns with the housing frangible portion.

11 Claims, 3 Drawing Sheets

COUPLING ASSEMBLIES HAVING FRANGIBLE PORTIONS

TECHNICAL FIELD

The present specification generally relates to coupling assemblies and, more specifically, coupling assemblies configured to break along frangible portions upon receipt of an impact.

BACKGROUND

Traditional fasteners and coupling assemblies rigidly couple two or more components together. These rigid couplings keep the components in rigid contact with one another. However, an impact may transfer from one component to the other component, damaging both components in the impact. Accordingly, a need exists for alternative coupling assemblies for coupling components that prevent transfer of an impact to the coupled components.

SUMMARY

In one embodiment, a coupling assembly for coupling a first component to a second component, the coupling assembly includes a pin and a housing. The pin includes a shaft and a pin frangible portion formed in the shaft. The housing includes a hollow body and a housing frangible portion formed in the hollow body. The housing is configured to receive the pin such that the shaft of the pin is received within the hollow body. When the pin is received in the hollow body the pin frangible portion aligns with the housing frangible portion.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
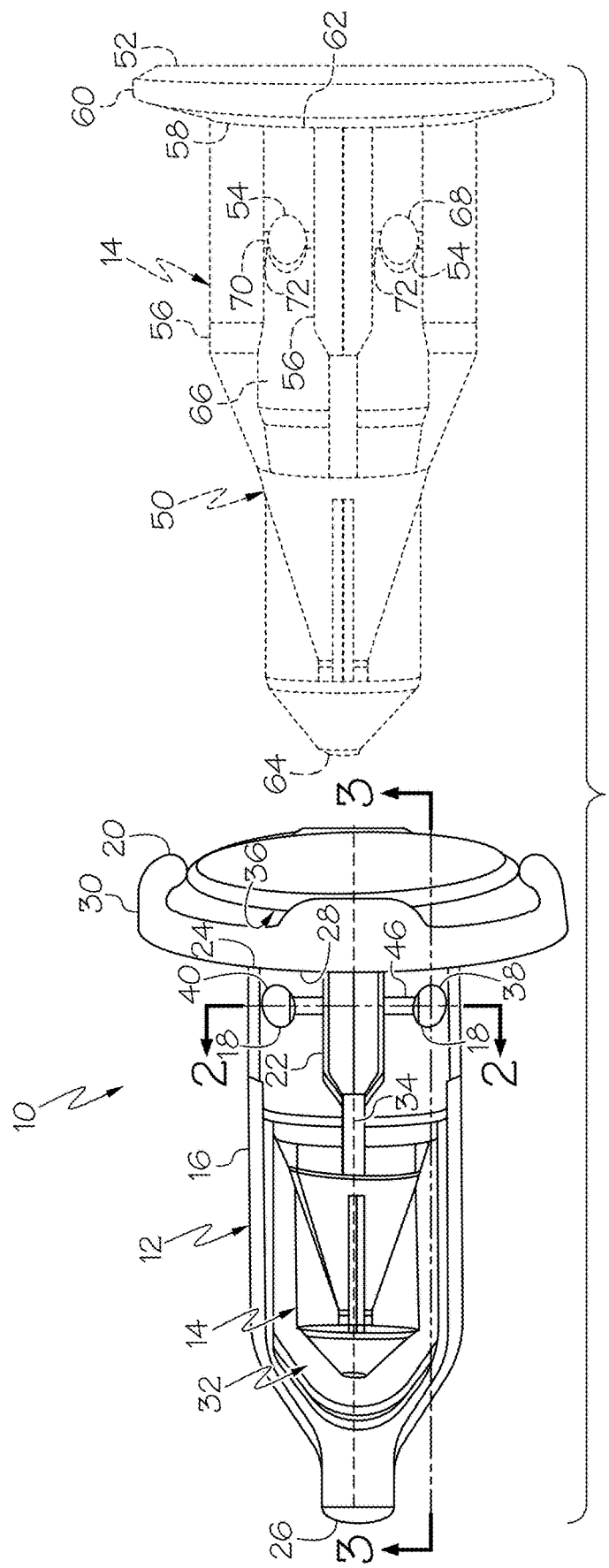
FIG. 1 schematically depicts a perspective view of a coupling assembly, according to one or more embodiments shown and described herein.
Figure 2:
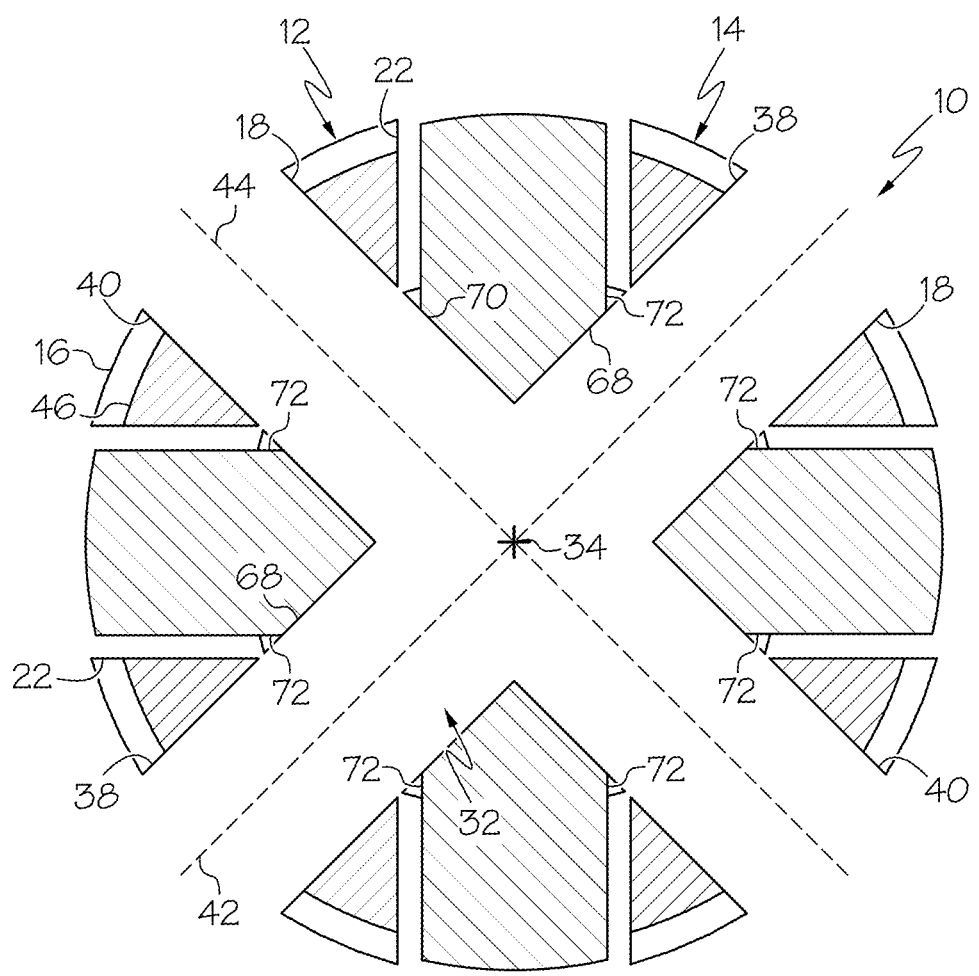
FIG. 2 schematically depicts a cross-sectional top view of the coupling assembly of FIG. 1 taken along line 2-2, according to one or more embodiments shown and described herein.
Figure 3:
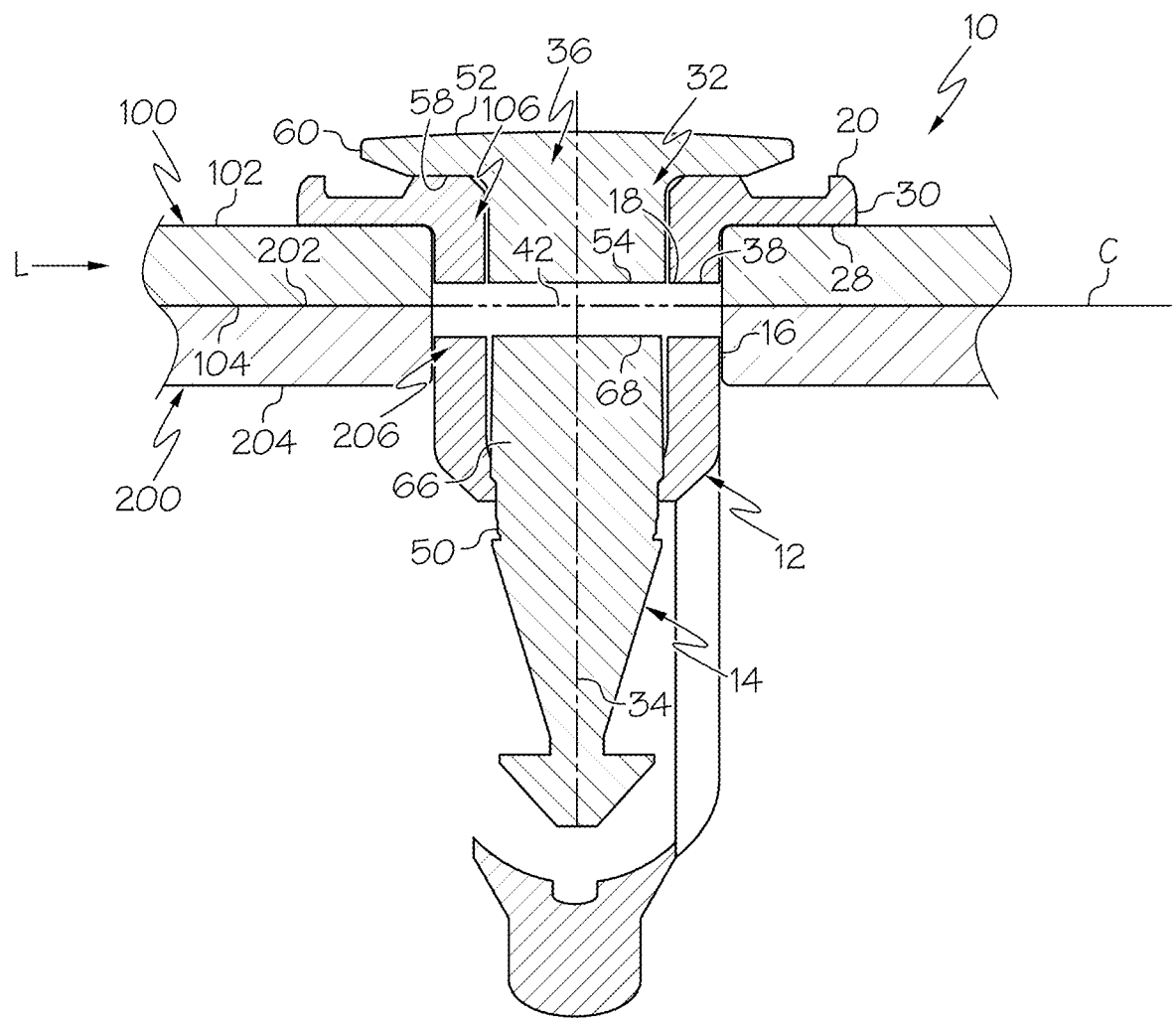
FIG. 3 schematically depicts a cross-sectional side view of the coupling assembly of FIG. 1 taken along line 3-3, according to one or more embodiments shown and described herein.

FIGS. 1-3 generally depict a coupling assembly for coupling two components together. The coupling assembly generally includes a pin and a housing, each of the pin and the housing include frangible portions configured to break upon an impact. The frangible portions may be aligned along a plane extending between the coupled components such that movement of one component relative to the other component fractures the frangible portions upon application of a load that exceeds a predetermined load. Each of the pin and the housing may include alignment components that align the frangible portions of the pin with the frangible portions of the housing. Various embodiments of the coupling assembly and the operation of the coupling assembly will be described in more detail herein.

Referring now to FIGS. 1-3, a coupling assembly 10 for coupling a first component 100 to a second component 200 is depicted. The coupling assembly 10 may include a housing 12 and a pin 14 configured to be received within the housing 12. The housing 12 may include a hollow body 16, a plurality of housing frangible portions 18, hereinafter referred to as frangible portions 18, formed in the hollow body 16, a crown 20, and a plurality of slots 22 formed in the hollow body 16. The hollow body 16 may include a first end 24 and an opposite second end 26. The crown 20 may include a contact surface 28 and a perimeter 30 circumferentially surrounding the contact surface 28. The crown 20 may be coupled to the first end 24 of the hollow body 16 such that the hollow body 16 extends from the contact surface 28 of the crown 20. The housing 12 may define a cavity 32 extending through the hollow body 16, a central axis 34 circumferentially surrounded by the hollow body 16 and extending between the first end 24 and the second end 26 of the hollow body 16, and an opening 36 extending through the crown 20 to the cavity 32. The housing 12 may be formed of a material capable of breaking at the frangible portions 18 upon an impact that applies a load that exceeds a predetermined load, such as, for example, plastic, metal, or the like. The frangible portions 18 may be a weakened portion that has a shear strength that is less than a shear strength of the rest of the hollow body 16 such that application of a first load on the frangible portions 18 shears the hollow body 16 at the frangible portions 18, and application of a second load on the hollow body 16 shears the hollow body 16, the second load being greater than the first load. In embodiments, the frangible portions 18 may be formed by removing material from the housing 12. The housing 12 may be formed as a one-piece monolithic structure such that each of the hollow body 16 and the crown 20 are integrally molded together. Alternatively, the hollow body 16 and the crown 20 may be formed separately and coupled together thereafter.

The plurality of frangible portions 18 may include a first pair of housing frangible portions 38, hereinafter referred to as the first pair of frangible portions 38, and a second pair of housing frangible portions 40, hereinafter referred to as the second pair of frangible portions 40. The first pair of frangible portions 38 may concentrically surround a first lateral axis 42, and the second pair of frangible portions 40 may concentrically surround a second lateral axis 44. The first lateral axis 42 may extend transverse to the second lateral axis 44 such that each of the plurality of frangible portions 18 is disposed 90 degrees from each adjacent frangible portion 18 relative to the central axis 34. However, in embodiments, each of the frangible portions 18 may be provided at any operable angle from the adjacent frangible portions 18 relative to the central axis 34. The first lateral axis 42 may intersect the second lateral axis 44 at the central axis 34. Each of the plurality of frangible portions 18 may be an aperture extending through the hollow body 16 to the cavity 32. In some embodiments, the apertures have a circular cross-section shape. However, in other embodiments, the apertures include any other operable cross-sectional shape extending through the hollow body 16, such as, for example, a triangle, a square, or the like. The plurality of frangible portions 18 may each be spaced apart from the contact surface 28 of the crown 20 a first distance. While the depicted housing 12 includes four frangible portions 18, the housing 12 may include any operable number of frangible portions 18 such that the housing 12 is configured to break upon an impact, such as one, two, three, four, or more than four frangible portions.

Alternatively or additionally, the plurality of frangible portions 18 may include a housing groove 46, hereinafter referred to as the groove 46, defined by the hollow body 16. The groove 46 may extend around the circumference of the hollow body 16 to circumferentially surround the central axis 34. The groove 46 may extend to intersect the first pair of frangible portions 38, the second pair of frangible portions 40, and the slots 22.

The plurality of slots 22 may extend from the first end 24 of the hollow body 16 toward the second end 26. The plurality of slots 22 may include four slots 22 positioned about the central axis 34. The four slots 22 may be equally spaced apart around a circumference of the hollow body 16, such that each slot is disposed 90 degrees from each adjacent slot relative to the central axis 34. The plurality of slots 22 may each be disposed between an adjacent pair of frangible portions 18. The slots 22 may be equally spaced apart from the adjacent pair of frangible portions 18 around the slot. While the housing 12 is depicted including four slots 22 disposed 90 degrees from each adjacent slot relative to the central axis 34, the housing 12 may include any operable number of slots 22 disposed at any operable angle such that the pin 14 may be coupled to the housing 12, such as one, two, three, four, or more than four slots 22.

Still referring to FIGS. 1-3, the pin 14 may include a shaft 50, a crown 52 coupled to the shaft 50, a plurality of pin frangible portions 54, hereinafter referred to as frangible portions 54, and a plurality of locating projections 56. The crown 52 may include a contact surface 58 and a perimeter 60 circumferentially surrounding the contact surface 58. The shaft 50 may include a first end 62, an opposite second end 64, and an outer surface 66. The shaft 50 may be sized to be configured to be received within the cavity 32 in the hollow body 16 of the housing 12. The outer surface 66 of the shaft 50 may circumferentially surround the central axis 34. The crown 52 may be coupled to the first end 62 of the shaft 50 such that the shaft 50 extends from the contact surface 58 of the crown 52. The pin 14 may be formed of a material capable of breaking at the frangible portions 54 upon an impact, such as, for example, plastic, metal, or the like. The frangible portions 54 of the pin 14 may be substantially similar to the frangible portions 54 of the housing 12 such that the frangible portions 54 are configured to shear upon a first load that is less than a second load that would shear the shaft 50 of the pin 14. The pin 14 may be formed as a one-piece monolithic structure such that each of the shaft 50 and the crown 52 are formed together. Alternatively, the shaft 50 and the crown 52 may be formed separately and coupled together thereafter.

The plurality of frangible portions 54 of the pin 14 may be complementary to the plurality of frangible portions 18 of the housing 12 such that the plurality of frangible portions 54 of the pin 14 are shaped and positioned similarly to the plurality of frangible portions 18 of the housing 12. The plurality of frangible portions 54 of the pin 14 may include a first pair of pin frangible portions 68, hereinafter referred to as the first pair of frangible portions 68, and a second pair of pin frangible portions 70, hereinafter referred to as the second pair of frangible portions 70. The first pair of frangible portions 68 may concentrically surround the first lateral axis 42 such that the first pair of frangible portions 68 of the pin 14 is aligned with the first pair of frangible portions 38 of the housing 12 when the pin 14 is inserted into the housing 12. The second pair of frangible portions 70 of the pin 14 may concentrically surround the second lateral axis 44 such that the second pair of frangible portions 70 of the pin 14 is aligned with the second pair of frangible portions 40 of the housing 12 when the pin 14 is inserted into the housing 12. Each of the plurality of frangible portions 54 of the pin 14 may be a bore that extends at least partially through or a through bore that extends entirely through the shaft 50. In some embodiments, the bores have a circular cross-section shape. However, in other embodiments, the bores may include any other operable cross-sectional shape extending through the shaft 50, such as, for example, a triangle, a square, or the like. The plurality of frangible portions 54 may each be spaced apart from the contact surface 58 of the crown 52 a second distance equal to the first distance. The plurality of frangible portions 54 may include any operable number of frangible portions 54 such that the pin 14 is configured to break upon an impact, such as one, two, three, four, or more than four frangible portions. The number of frangible portions 54 of the pin 14 may be equal to the number of frangible portions 18 of the housing 12.

Alternatively or additionally, the plurality of frangible portions 54 of the pin 14 may include a pin groove 72, hereinafter referred to as the groove 72, defined by the shaft 50. The groove 72 may extend around the circumference of the shaft 50 to circumferentially surround the central axis 34. The groove 72 may extend to intersect the first pair of frangible portions 68 and the second pair of frangible portions 70. In embodiments, the groove 72 may extend through the locating projections 56. In other embodiments, the groove 72 may be interrupted by the locating projections 56 such that the groove 72 is segmented around the shaft 50.

The plurality of locating projections 56 may extend from the first end 62 of the shaft 50 toward the second end 64. The plurality of locating projections 56 may include four projections positioned about the central axis 34. The four locating projections 56 may be equally spaced apart around a circumference of the shaft 50, such that each projection is disposed 90 degrees from each adjacent projection relative to the central axis 34. The locating projections 56 may be configured to be positioned within the plurality of slots 22 in the housing 12 to align the pin 14 relative to the housing 12. While the pin 14 is depicted including four locating projections 56 disposed 90 degrees from each adjacent locating projection relative to the central axis 34, the pin 14 may include any operable number of locating projections 56 disposed at any operable angle such that the pin 14 may be coupled to the housing 12, such as one, two, three, four, or more than four locating projections 56.

Still referring to FIGS. 1-3, when the pin 14 is positioned within the housing 12, the shaft 50 of the pin 14 is positioned in the cavity 32 defined by the hollow body 16 of the housing 12. The contact surface 58 of the crown 52 of the pin 14 contacts the crown 20 of the housing 12 to locate the pin 14 relative to the housing 12 along the central axis 34. The locating projections 56 of the pin 14 may be inserted into the slots 22 of the housing 12 to locate the pin 14 relative to the housing 12 in a rotational direction about the central axis 34 to align the frangible portions 54 of the pin 14 with the frangible portions 18 of the housing 12. When the pin 14 is located relative to the housing 12, the first pair of frangible portions 68 of the pin 14 is aligned with the first pair of frangible portions 38 of the housing 12 such that each of the first pair of frangible portions 68 of the pin 14 and the first pair of frangible portions 38 of the housing 12 circumferentially surround the first lateral axis 42 with the first lateral axis 42 extending through a center of each of the first pair of frangible portions 68 of the pin 14 and the first pair of frangible portions 38 of the housing 12. Similarly, the second pair of frangible portions 70 of the pin 14 is aligned with the second pair of frangible portions 40 of the housing 12 such that each of the second pair of frangible portions 70 of the pin 14 and the second pair of frangible portions 40 of the housing 12 circumferentially surround the second lateral axis 44 with the second lateral axis 44 extending through a center of each of the second pair of frangible portions 70 of the pin 14 and the second pair of frangible portions 40 of the housing 12. In other words, when the frangible portions 18 of the housing 12 are aligned with the frangible portions 54 of the pin 14, the first pair of frangible portions 68 of the pin 14 are coaxial with the first pair of frangible portions 38 of the housing 12, and the second pair of frangible portions 70 of the pin 14 are coaxial with the second pair of frangible portions 40 of the housing 12.

Referring to FIG. 3, the first component 100 may include a first surface 102, an opposite second surface 104, and an opening 106 extending through the first component 100 from the first surface 102 to the second surface 104. The first component 100 may have a thickness defined by a distance between the first surface 102 and the second surface 104. The second component 200 may include a first surface 202, an opposite second surface 204, and an opening 206 extending through the second component 200 from the first surface 102 to the second surface 104. Each of the first component 100 and the second component 200 may be, for example, a component on a vehicle, such as body panels, lighting assemblies, or the like. However, it is contemplated and possible for the components 100, 200 to be any components that are coupled together and may be subject to an impact that can damage the components.

The pin 14 and the housing 12 may be configured to couple the first component 100 to the second component 200. When coupling the first component 100 to the second component 200, the housing 12 may be inserted into the opening 106 of the first component 100 and the opening 206 of the second component 200. The contact surface 28 of the crown 20 of the housing 12 may contact the first surface 102 of the first component 100 to locate the plurality of frangible portions 18 of the housing 12 relative to the first component 100 and the second component 200. The pin 14 may be inserted into the housing 12 to couple the pin 14 to the housing 12. When the pin 14 is coupled to the housing 12, the pin 14 may expand the hollow body 16 of the housing 12 radially outward from the central axis 34 to form a press fit within the opening 106 in the first component 100 and the opening 206 in the second component 200. The press fit from the pin 14 and the housing 12 couples the first component 100 to the second component 200. Particularly, the insertion of the pin 14 into the housing 12 causes the hollow body 16 of the housing 12 to expand to have a diameter that is greater than a diameter of the opening 106 in the first component 100 and the opening 206 in the second component 200.

When the coupling assembly 10 is coupled to the first component 100 and the second component 200, the second surface 104 of the first component 100 may interface with the first surface 202 of the second component 200 along a contact plane C. The contact plane C may be spaced apart from the first surface 102 of the first component 100 by the thickness of the first component 100. The contact plane C may extend in parallel with the first surface 102 of the first component 100, the second surface 104, or both. When the housing 12 and the pin 14 are inserted into the opening 106 in the first component 100 and the opening 206 in the second component 200, the contact plane C may intersect the plurality of frangible portions 18 of the housing 12 and the plurality of frangible portions 54 of the pin 14 such that the plurality of frangible portions 18 of the housing 12 and the plurality of frangible portions 54 of the pin 14 are positioned along the contact plane C. When the housing 12 and the pin 14 are inserted into the opening 106 in the first component 100 and the opening 206 in the second component 200, the plurality of frangible portions 54 of the pin 14 and the plurality of frangible portions 18 of the housing 12 are spaced apart from the contact surface 28 of the crown 20 of the housing 12 by the thickness of the first component 100.

When the frangible portions 18 of the housing 12 are aligned with the frangible portions 54 of the pin 14, the coupling assembly 10 is configured to shear through the frangible portions 18 of the housing 12 and the frangible portions 54 of the pin 14 along the contact plane C upon receipt of a predetermined load L. The load L may be applied to one of the first component 100 and the second component 200, for example the first component 100. When the load L is applied to the first component 100, the first component 100 may move relative to the second component 200, thereby shearing the housing 12 and the pin 14 at the frangible portions 18 and the frangible portions 54, respectively. The coupling assembly 10 may break along the contact plane C through the frangible portions 18 of the housing 12 and the frangible portions 54 of the pin 14 to decouple the first component 100 from the second component 200. Accordingly, when the coupling assembly 10 decouples the first component 100 from the second component 200, the applied load L breaks the coupling assembly 10 to prevent the load L from damaging both of the first component 100 and the second component 200.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A coupling assembly configured to couple a first component to a second component, the coupling assembly comprising:
   a pin comprising a shaft and a pin frangible portion formed in the shaft, the pin frangible portion includes a bore; and
   a housing comprising a hollow body and a housing frangible portion formed in the hollow body, the housing frangible portion includes an aperture, the housing configured to receive the pin such that the shaft of the pin is received within the hollow body, when the pin is received in the hollow body an axis of the bore of the pin frangible portion aligns with an axis of the aperture of the housing frangible portion.

2. The coupling assembly of claim 1, wherein:
   the pin and the housing are configured to couple the first component to the second component such that a second surface of the first component interfaces with a first surface of the second component along a contact plane, and when the pin and the housing couple the first component to the second component, the pin frangible portion and the housing frangible portion are positioned along the contact plane.

3. The coupling assembly of claim 2, wherein:

the housing further comprises a crown having a contact surface, the shaft extends from the contact surface of the crown, when the pin and the housing couple the first component to the second component, the contact surface of the crown contacts a first surface opposite the second surface of the first component, and a distance between the contact surface of the crown and the housing frangible portion is equal to a distance between the first surface and the second surface of the first component.

4. The coupling assembly of claim 1, wherein:

the pin comprises a plurality of pin frangible portions including the pin frangible portion, each of the plurality of pin frangible portion includes comprises a bore; and the housing comprises a plurality of housing frangible portions including the housing frangible portion, each of the plurality of housing frangible portion includes comprises an aperture.

5. The coupling assembly of claim 4, wherein the plurality of pin frangible portions comprises a first pair of pin frangible portions and a second pair of pin frangible portions, each axis of each bore of the first pair of pin frangible portions concentrically surrounds a first lateral axis, each axis of each bore of the second pair of pin frangible portions concentrically surrounds a second lateral axis, the first lateral axis extending transverse to the second lateral axis.

6. The coupling assembly of claim 5, wherein the plurality of housing frangible portions comprises a first pair of housing frangible portions and a second pair of housing frangible portions, when the pin is received in the hollow body each axis of each aperture of the first pair of housing frangible portions concentrically surrounds the first lateral axis, and each axis of each aperture of the second pair of housing frangible portions concentrically surrounds the second lateral axis.

7. The coupling assembly of claim 6, wherein the first lateral axis and the second lateral axis intersect at a central axis, the central axis being circumferentially surrounded by the hollow body of the housing.

8. The coupling assembly of claim 1, wherein the pin frangible portion comprises a pin groove, and the housing frangible portion comprises a housing groove.

9. The coupling assembly of claim 8, wherein the pin groove extends along a circumference of the shaft of the pin, and the housing groove extends along a circumference of the hollow body of the housing.

10. The coupling assembly of claim 1, wherein:

the pin further comprises a locating projection extending from a circumference of the shaft, the housing further comprises a slot formed in the hollow body, and when the pin is inserted into the housing, the locating projection is positioned within the slot to align the pin frangible portion with the housing frangible portion.

11. The coupling assembly of claim 1, wherein the pin and the housing are formed of plastic.

* * * * *